United States Patent [19]

Ballard et al.

[11] Patent Number: 4,596,715

[45] Date of Patent: Jun. 24, 1986

[54] DRY MIX FOR LOW-OIL SALAD DRESSING

[75] Inventors: Bruce F. Ballard; Jeffrey M. Schweid; Anthony F. Dec, all of Dover, Del.

[73] Assignee: General Foods Corporation, White Plains, N.Y.

[21] Appl. No.: 653,401

[22] Filed: Sep. 24, 1984

[51] Int. Cl.$^4$ .............................. A23L 1/24; A23L 1/04
[52] U.S. Cl. ..................... 426/573; 426/578; 426/589; 426/605; 426/613; 426/654
[58] Field of Search ............. 426/613, 589, 578, 573, 426/605, 654

[56] References Cited

U.S. PATENT DOCUMENTS

| | | | |
|---|---|---|---|
| 3,560,220 | 2/1971 | Bangert | 426/589 |
| 3,582,362 | 6/1971 | Drews | 426/613 |
| 3,676,157 | 7/1972 | Wintersdorff | 426/605 |
| 3,996,389 | 12/1976 | Osborne | 426/654 |
| 4,107,335 | 8/1978 | Glickstein et al. | 426/605 |
| 4,216,243 | 8/1980 | Hermann | 426/654 |
| 4,242,367 | 12/1980 | Igoe | 426/654 |
| 4,352,832 | 10/1982 | Wood | 426/589 |
| 4,423,084 | 12/1983 | Trainor | 426/589 |
| 4,496,602 | 1/1985 | Miller | 426/578 |

*Primary Examiner*—Jeanette Hunter
*Attorney, Agent, or Firm*—Sam D. Walker; Thomas R. Savoie; Daniel J. Donovan

[57] ABSTRACT

A dry mix and simplified method for preparing a reduced oil salad dressing are disclosed. Full oil texture and mouthfeel are imparted to the dressing by a combination of low oil content, an instant, waxy maize starch, xanthan gum and guar gum. The salad dressing containing from about 10 to about 30%, by volume of oil, is made by simple hand shaking.

14 Claims, No Drawings

DRY MIX FOR LOW-OIL SALAD DRESSING

TECHNICAL FIELD

This invention relates to salad dressing, and, in particular, to a low-oil salad dressing mix for home preparation into a dressing having a taste, texture and mouthfeel similar to that of a dressing employing the normal complement of oil.

While any number of diverse ingredients can be used in the preparation of salad dressing, oil has almost universally been considered important for its contribution to mouthfeel and overall eating quality. These ingredients can be combined in a myriad of ways to create dressings having thousands of different flavors. In general, however, premium quality salad dressings will typically have oil contents of at least about 50% by volume.

The oil in a salad dressing balances the flavor of the dressing and imparts acceptable texture and mouthfeel. The oil is usually the single most caloric component of the dressing. It contributes about 125 calories per tablespoon of oil or between about 63 and about 75 calories per tablespoon of dressing.

It is desirable to prepare salad dressing having reduced quantities of oil for persons on calorie-restricted diets and for persons who must restrict their intake of oil for other reasons. In doing so it is necessary to replace, not only the flavor imparted by the oil, but also the texture and mouth feel. Replacement of all of these properties simultaneously, especially in a dry mix suitable for home preparation, is often deficient and unsatisfactory.

BACKGROUND ART

Several dry mixes have been available for preparing salad dressings with reduced calorie content. These mixes, however, have been formulated to eliminate addition of all oils, and have not been able to satisfactorily duplicate the flavor, mouthfeel, and texture of regular, high-oil salad dressings. Some success has been had by employing starch or various gums or other hydrophilic colloids to achieve a desirable mouthfeel and viscosity. The mouthfeel is, however, quite distinct from that which is achieved by oil.

Attempts have also been made to provide reduced oil contents in pre-prepared salad dressings. However, no dry mixes enabling home preparation of salad dressings which successfully duplicate the flavor, mouthfeel and other desirable characteristics of full oil dressings, yet contain from only 10 to 30% oil, are known.

Available mixes which employ starches and gums to simply match the flow properties of a full-oil-content dressing cannot be rapidly mixed with oil without lumping if mixed by simple hand shaking.

DISCLOSURE OF INVENTION

A dry mix is provided according to the present invention which surprisingly closely achieves the mouth feel of a full-oil-content salad dressing while employing only a limited amount of oil. The oil added to the mix during preparation amounts to only 10 to 30 percent of the volume of the dressing. However, this amount of oil, when employed, with the starch, xanthan gum and guar gum according to the invention, is all that is needed to achieve the mouthfeel of a full-oil-content dressing, a result which has not been achieved by oil-free dressings. Also provided by the invention, is a simplified method of preparing a salad dressing having a low oil content.

The dry mix of the invention is capable of preparing a salad dressing having an oil content of from about 10 to about 30% of the volume of the dressing. The dressing also contains water, an edible acid such as vinegar, and suitable flavorants, and comprises, for each quantity of mix for preparing one liter of salad dressing: from 6 to 15 grams of pre-cooked, cold-swelling, acid-stable starch; from 1 to 2.25 grams of xanthan gum; and from 0.25 to 2.00 grams of guar gum, the amount of xanthan gum being greater than or equal to the amount of guar gum.

The method of the invention comprises, for each liter of dressing: admixing dry mix according to the invention with sufficient water and acidulent, such as vinegar, to provide from about 700 to about 900 ml of an aqueous phase; adding to the aqueous phase sufficient liquid triglyceride oil to make a liter; and admixing the oil with the aqueous phase.

Simple preparation, and excellent texture and mouth feel are imparted to the dressing by a novel combination of oil, starch and gums. In a preferred embodiment, modified pregelatinized waxy maize starch is used as the cold-swelling, acid-stable starch.

The salad dressing prepared from the dry mix of the present invention is an oil-in-water emulsion. It is prepared from the dry ingredients, an acidulent such as vinegar, water, and oil, by a process which is suitable for the home, because it involves nothing more complicated than mixing and hand shaking. The dry mix of ingredients, which includes the starch, the gums, and other dry ingredients, readily mixes, with water, vinegar and oil, free from lumping, to achieve a desirable consistency and eating quality.

The amounts of the various ingredients are described in terms of quantities necessary to prepare one liter of dressing. It will, of course, be understood by those skilled in the art that the amounts can be varied proportionally to enable the preparation of any other desired unit of measure. For example, for the preparation of a volume equal to one cup (i.e., 8 ounces or 240 ml), the various amounts will be divided by 4.167 cups/liter.

To prepare the dry mix, the dry ingredients are simply dry-blended, such as in a V-blender or a horizontal ribbon blender to achieve uniform distribution. The dry mix is then weighed and packaged in portion-controlled, moisture proof packages.

The starch which is used in the dry salad dressing mix of the present invention must be an instant starch, i.e., a starch that forms a gel in cold water. Such a starch is referred to as a cold swelling, pre-cooked starch. Due to the presence of acid in the dressing, the starch should also be acid-stable. Such starches include, but are not limited to, modified waxy maize starch, tapioca starch, corn starch, rice starch, potato starch and the like.

In a preferred embodiment, suitably modified waxy maize starch is used. The starch is prepared so as to be particularly suitable for use in highly-acidic, cold food processes. An especially preferred formulation of such a starch is sold by American Maize Products Company, Corn Processing Division, Hammond, Ind. under the trade designation Instant W-11 Starch. This starch, which is desirable because of its clarity and its ability to form soft semi-fluid gels with good storage stability, has the following characteristics:

| Property | Limits |
| --- | --- |
| Granulation[1] | |
| On 100 Mesh | 12% maximum |
| On 200 Mesh | 15–35% |
| On 325 Mesh | 25–45% |
| Thru 325 Mesh | 35% minimum |
| Moisture[2] | 6.0% maximum |
| pH (5% solution) | 4.0–6.0 |
| Brabender Visco-Amylograph[3] | |
| Final Viscosity at 95° C. | 225–425 BU |

[1]: RoTap Shaker, 50 gms./10 min.
[2]: Air Oven, 100–105° C./17 hrs.
[3]: 6.2% solution in water.

The amount of starch which is used is controlled by the consistency desired in the salad dressing. If the amount of starch is too great, the resultant dressing will be thick and lumpy; if the amount is too low, the dressing will be thin and runny. It is generally desirable to use an amount of starch that will maintain the consistency of the salad dressing in the range between these extremes.

In a preferred embodiment, the starch is employed, for each quantity of dry mix for preparing one liter of dressing, in an amount of from about 6 to about 15 grams, more preferably from about 8 to about 13 grams, and most preferably in an amount of from 10 to 11 grams.

The gums used in the practice of the present invention must be water-miscible, easily-dispersible, and stable in acidic solutions. They act in conjunction with the starch to thicken, extend the oily mouthfeel, and give a satisfactory texture to the dressing.

Xanthan gum is particularly useful in the practice of the present invention. It is a high molecular weight polysaccharide and functions as a hydrophilic colloid to thicken, suspend and stabilize emulsions and other water-based systems. An especially suitable formulation of xanthan gum is sold by Kelco Division of Merck & Co., Inc., Rahway, N.J. under the trademark KELTROL ® and KELTROL ® F, and has the following specifications:

Dry Color: Cream
Particle Size:
  KELTROL—at least 100% through 60 mesh[1] (250 micron) and at least 95% through 80 mesh (177 micron).
  KELTROL F—at least 100% through 80 mesh (177 micron) and at least 92% through 200 mesh (74 micron).
pH: 7.1±1.0
Viscosity: 1200–1600$_2$cP (1% salt solution)

1: Tyler standard screen.
2: Viscosity is measured on an LV model Brookfield Snycro-Lectric viscometer at 60 rpm, No. 3 spindle, 25° C. One centipoise (cP) is equal to one Milli Pascal second (mPa. Sec.).

Guar gum is also especially useful in the practice of the present invention. Guar gum is the refined endosperm of the leguminous plant *Cyamposis tetragonolobus*. It has a bland taste and odor, but is useful as a thickener, stabilizer and bodying agent. Guar gum is sold, for example, by Henkel Corporation Food Ingredients Division, Minneapolis, MN under the trademark SUPER-COL ® F. This gum, which is a preferred one of choice, has the following specifications:

Dry color: Cream White
Sol color: White
Moisture: 13.0% maximum
Protein: 5.5% maximum
Fiber: 2.5% maximum
Fat (EE): 0.4% maximum
Ash: 0.8% maximum
Mesh, thru 100: 98% minimum
Mesh, thru 200: 80% spec 85% typical
Viscosity: 3000 cPs (1% solution)[3]

3: 1% SuperCol F on as-is moisture basis 77° F. water, Brookfield viscometer with #3 spindle @ 20 RPM.

Both xanthan gum and guar gum are used according to the invention, with the level of xanthan gum being greater than or equal to the level of guar gum. The xanthan gum is employed in an amount from about 1 to about 2.25 grams, and the guar gum is used in an amount of from about 0.25 to about 2.00 grams, for each quantity of dry mix for preparing one liter of salad dressing. The total level of gums on the same basis will preferably be from about 2.0 to about 4.0 grams, and the preferred ratio of the xanthan to guar gums will be about 2:1.

Many other dry ingredients may also be used in the dry mix of the present invention. Although at least one, and generally more, of these other dry ingredients should be used to impart flavor and other qualities to the dressing, the use of any particular ingredient is optional.

All of the dry ingredients which are used must be soluble to the desired degree in water and stable in acidic solutions. Suitable dry ingredients are selected from the group consisting of flavoring agents, stabilizers, flavor enhancers, preservatives, and coloring agents. Some ingredients, such as carrot granules, peppers of various types, parsely and onion are added in insoluble form to impart color as well as flavor.

Examples of flavoring agents include, but are not limited to, sugar, salt, sodium citrate, garlic, onion, black pepper, red bell pepper, carrots, minced green onion, spices and other natural flavors. These flavoring agents may be used in amounts from about 0.1 to about 5.0 grams for each liter of dressing.

Suitable flavor enhancers include, but are not limited to, monosodium glutamate and salt. In an especially preferred embodiment, monosodium glutamate is used in an amount from about 1.5 to about 3 grams per liter of dressing.

Suitable preservatives include, but are not limited to, sodium sulfites, TBHQ, BHA which will be employed in amounts effective for their intended functions.

The dry mix is combined with vinegar, water, and oil to prepare the salad dressing of the present invention. The vinegar, water, and oil are preferably employed at ambient temperature. The method of the invention comprises, for each liter of dressing: admixing dry mix according to the invention with sufficient water and acidulent such as vinegar to provide from about 700 to about 900 ml of an aqueous phase; adding to the aqueous phase, sufficient liquid triglyceride oil to make a liter; and admixing the oil with the aqueous phase.

It is an advantage of the present invention that all addition of these components and mixing can be done at home by the consumer with no more complicated procedure than hand shaking.

The oil will be employed at a level of from about 10 to about 30% of the volume of the final dressing to achieve the desired oily mouthfeel but yet reduce the level from that which is typical. This desirable combination of features is enabled by the use of the starches and gums in the dry mix with the reduced level of oil. More preferred oil levels are within the range of from 15 to 20%.

The practice of the invention is not intended to be limited in any way by the type of oil which is used, except that it should be liquid at room temperature, and preferably at refrigerator temperature. Suitable oils for use in the practice of the present invention include, but are not limited to, corn oil, peanut oil, safflower, sesame oil, sunflower oil, olive oil, soybean oil, and the like.

Any type of edible acidulent, preferably vinegar, may be used in the practice of the present invention and the practice of the invention is not limited in any way by the type of vinegar or other acidulent which is used. A distilled white vinegar (e.g., 50 grain) is, however, preferred. Other suitable vinegars include, but are not limited to, wine vinegar, cider vinegar, tarragon vinegar and the like. Preferably, the salad dressing will include from about 200 to about 300 ml of vinegar for each liter of salad dressing.

In a preferred embodiment, the salad dressing of the present invention is prepared by first combining the vinegar and water in a container. Then the mixture of dry ingredients is added and the container is shaken by hand, e.g., for ten seconds, in order to obtain a uniform dispersion of the ingredients. The oil is then added and the container is again shaken by hand thoroughly in order to obtain the oil-in-water dispersion which is the salad dressing of the present invention.

The prepared salad dressing is of the oil and vinegar, "Italian", type and, in a preferred embodiment, has a tangy flavor. The dressing may be used immediately after preparation or refrigerated for future use. The viscosity of the dressing is suitable for use immediately after preparation, but peaks after about 24 hours of refrigerated storage. In practice, the dressing is sold as the mixture of dry ingredients and the vinegar, water and oil are added by the consumer.

As prepared, the salad dressing which has been described has a taste, texture, and mouthfeel similar to those of a regular oil salad dressing. This is true in spite of the fact that the salad dressing of the present invention has less than about one-half the oil of a regular salad dressing. The caloric value of the salad dressing of the present invention is also significantly reduced.

BEST MODE FOR CARRYING OUT THE INVENTION

The following examples describe the best mode for preparing the dry mix and then mixing it to form a salad dressing in accordance with the invention.

EXAMPLE I

The following ingredients are blended in a V-blender to prepare a quantity of dry mix for preparing one liter of salad dressing:

| Ingredient | Weight (grams) |
| --- | --- |
| Sucrose | 23.25 |
| Sodium Chloride | 22.83 |
| Sodium Citrate | 12.26 |
| Vegetables | 22.01 |
| Spice | 2.53 |
| Monosodium Glutamate | 1.94 |
| Lemon Flavor | 0.17 |
| Instant Starch | 10.57 |
| Xanthan Gum | 1.90 |
| Guar Gum | 1.06 |

Two hundred fifty (250) milliliters (ml) of vinegar (50 grain) and 500 ml of water are combined in a shaker flask. The mixture of dry ingredients is added and the flask is shaken thoroughly by hand for 10 seconds. One hundred eighty eight (188) ml of oil is then added to the flask and the flask is again shaken thoroughly for 10 seconds. The flask is left to stand at room temperature for 10 minutes. The resultant dressing had good taste, texture and mouthfeel.

EXAMPLE II

The following ingredients are blended in a V-blender to prepare a quantity of dry mix for preparing one liter of salad dressing:

| Ingredient | Weight (grams) |
| --- | --- |
| Salt | 22.40 |
| Sucrose | 17.30 |
| Vegetables | 27.10 |
| Spices | |
| Monosodium Glutamate | 2.10 |
| Citric Acid | 0.13 |
| Instant Starch | 10.60 |
| Xanthan Gum | 1.70 |
| Guar Gum | 1.30 |

Two hundred fifty (250) milliliters (ml) of vinegar (50 grain) and 500 ml of water are combined in a shaker flask. The mixture of dry ingredients is added and the flask is shaken thoroughly by hand for 10 seconds. One hundred eighty eight (188) ml of oil is then added to the flask and the flask is again shaken thoroughly for 10 seconds. The flask is left to stand at room temperature for 10 minutes. The resultant dressing had good taste, texture and mouthfeel.

EXAMPLE III

The following ingredients are blended in a V-blender to prepare a quantity of dry mix for preparing one liter of salad dressing:

| Ingredient | Weight (grams) |
| --- | --- |
| Salt | 16.90 |
| Sucrose | 15.30 |
| Vegetables | 18.20 |
| Spices | 1.70 |
| Monosodium Glutamate | 2.10 |
| Sodium Citrate | 14.00 |
| Instant Starch | 9.70 |
| Xanthan Gum | 1.70 |
| Guar Gum | 1.70 |
| Cheese | 12.70 |
| Cheese Flavor | 16.90 |

Two hundred fifty (250) milliliters (ml) of vinegar (50 grain) and 500 ml of water are combined in a shaker flask. The mixture of dry ingredients is added and the flask is shaken thoroughly by hand for 10 seconds. One hundred eighty eight (188) ml of oil is then added to the flask and the flask is again shaken thoroughly for 10 seconds. The flask is left to stand at room temperature for 10 minutes. The resultant dressing had good taste, texture and mouthfeel.

Although the present invention has been described in some detail by way of illustration and example for purposes of clarity and understanding, it will, of course, be understood that various changes may be made in the details of the ingredients used without departing from the scope of the invention, which is defined as set forth in the appended claims.

We claim:

1. A dry mix for preparing a salad dressing having an oil content of from about 10 to about 30% of the volume, in combination with water, an edible acid and suitable flavorants, the dry mix comprising for each quantity of mix for preparing 1 liter of salad dressing: from 6 to 15 grams of pre-cooked, cold-swelling, acid-stable starch; from 1 to 2.25 grams of xanthan gum; and from 0.25 to 2.00 grams of guar gum, the amount of xanthan gum being greater than or equal to the amount of guar gum.

2. A dry mix according to claim 1 wherein the total level of gums is from about 2.0 to about 4.00 grams.

3. A dry mix according to claim 1 wherein the ratio of xanthan gum to guar gum is about 2:1.

4. A dry mix according to claim 1 wherein the starch is present at a level of from about 10 to about 11 grams and the total level of gums is from about 2.0 to about 4.0 grams.

5. A dry mix according to claim 4 wherein the ratio of xanthan gum to guar gum is about 2:1.

6. A dry mix according to claim 1 wherein the starch is present at a level of about 10.6 grams, the xanthan gum is present at a level of about 1.90 grams and the guar gum is present at a level of about 1.06 grams.

7. A method for preparing a reduced caloric salad dressing comprising, for each liter of dressing: admixing a dry mix according to claim 1 with sufficient water and vinegar to provide from about 700 to about 900 ml of an aqueous phase; adding to the aqueous phase, sufficient liquid triglyceride oil to make a liter; and admixing the oil with the aqueous phase.

8. A method for preparing a reduced caloric salad dressing comprising, for each liter of dressing: admixing a dry mix, according to claim 1 with sufficient water and vinegar to provide 700 to 900 ml of an aqueous phase and sufficient oil to make a liter and admixing the mixture for 10 seconds.

9. A method according to claim 7 wherein the water and vinegar are premixed and the dry mix is added thereto to form a mixture which is then shaken by hand to prepare the aqueous phase; and the oil and the aqueous phase are admixed by shaking by hand.

10. A method according to claim 7 wherein the oil comprises from 15 to 20% of the volume of the salad dressing.

11. A method according to claim 10 wherein the total level of gums in the dry mix is from about 2.0 to about 4.0 grams.

12. A method according to claim 11 wherein the ratio of xanthan gum to guar gum is about 2:1.

13. A method according to claim 12 wherein the starch is present at a level of from about 10 to about 11 grams.

14. A method according to claim 13 wherein the starch is present at a level of about 10.6 grams, the xanthan gum is present at about 1.90 grams, the guar gum is present at a level of about 6.06 grams, and the oil is present at a level of about 188 ml.

* * * * *